(12) United States Patent
Rajvanshi

(10) Patent No.: US 10,784,660 B1
(45) Date of Patent: Sep. 22, 2020

(54) ENHANCING AN AUXILIARY COMPARTMENT OF A MODULAR BUCKET ASSEMBLY IN AN ARC RESISTANT SWITCHGEAR

(71) Applicant: Siemens Industry, Inc., Alpharetta, GA (US)

(72) Inventor: Rahul Rajvanshi, Irving, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 16/815,863

(22) Filed: Mar. 11, 2020

(51) Int. Cl.
| | |
|---|---|
| H02B 1/18 | (2006.01) |
| H02B 1/20 | (2006.01) |
| H02B 1/24 | (2006.01) |
| H02B 1/28 | (2006.01) |
| H02B 1/38 | (2006.01) |
| H02B 1/48 | (2006.01) |
| H02B 1/56 | (2006.01) |
| H02B 13/025 | (2006.01) |
| H05K 5/02 | (2006.01) |

(52) U.S. Cl.
CPC ............ *H02B 13/025* (2013.01); *H02B 1/18* (2013.01); *H02B 1/202* (2013.01); *H02B 1/24* (2013.01); *H02B 1/28* (2013.01); *H02B 1/38* (2013.01); *H02B 1/48* (2013.01); *H02B 1/565* (2013.01); *H05K 5/0213* (2013.01)

(58) Field of Classification Search
CPC ........ H02B 13/025; H02B 1/18; H02B 1/202; H02B 1/24; H02B 1/38; H02B 1/48; H02B 1/565; H05K 5/0213

USPC ......... 218/157, 155; 200/306; 361/608, 628, 361/641, 600
See application file for complete search history.

(56) References Cited

U.S. PATENT DOCUMENTS

| | | | |
|---|---|---|---|
| 5,689,097 A * | 11/1997 | Aufermann | H02B 1/565 218/157 |
| 5,710,402 A | 1/1998 | Kambach et al. | |
| 6,407,331 B1 | 6/2002 | Smith et al. | |
| 7,391,597 B2 | 6/2008 | Meeks et al. | |
| 7,598,833 B1 | 10/2009 | Hodges et al. | |
| 7,821,774 B2 | 10/2010 | Josten et al. | |
| 7,952,857 B1 | 5/2011 | Motley et al. | |
| 7,974,078 B2 | 7/2011 | Coomer et al. | |
| 8,242,395 B2 | 8/2012 | Josten et al. | |
| 8,451,589 B2 | 5/2013 | Milovac et al. | |
| 8,482,903 B2 | 7/2013 | Milovac et al. | |
| 8,598,484 B2 | 12/2013 | Engel et al. | |

(Continued)

*Primary Examiner* — William A Bolton

(57) ABSTRACT

A modular bucket assembly of a low voltage switchgear includes a box shaped bucket having an interior bucket side wall, an exterior bucket side wall with vents in a first periphery, a bucket rear wall, a bucket top wall and a bucket bottom wall. All of the bucket walls define an auxiliary compartment of a switchgear cabinet. The vents in the exterior bucket side wall define an arc gas venting passage in communication with an interior of the auxiliary compartment for exhausting arc gasses to an exterior of the cabinet. The modular bucket assembly further comprises a metal enclosure mounted on the bucket bottom wall. The metal enclosure has a side opening with a second periphery such that the second periphery overlaps the first periphery of the exterior bucket side wall. The metal enclosure is configured to house direct power connected devices and protective fuses and withstand arc fault pressures.

20 Claims, 8 Drawing Sheets

(56) References Cited

U.S. PATENT DOCUMENTS

| | | | |
|---|---|---|---|
| 8,648,274 B2 | 2/2014 | Carlson et al. | |
| 8,733,855 B2 | 5/2014 | Josten et al. | |
| 8,791,361 B2 | 7/2014 | Gingrich | |
| 8,821,622 B2 | 9/2014 | Manahan et al. | |
| 8,842,421 B2 | 9/2014 | Gingrich | |
| 8,952,252 B2 | 2/2015 | Bugaris et al. | |
| 9,007,746 B2 * | 4/2015 | Rajvanshi | H05K 7/20581 |
| | | | 361/678 |
| 9,302,213 B2 | 4/2016 | Manahan et al. | |
| 9,426,907 B2 | 8/2016 | Karandikar et al. | |
| 9,438,015 B2 | 9/2016 | Arcos et al. | |
| 9,462,710 B2 | 10/2016 | Karandikar et al. | |
| 9,472,925 B2 | 10/2016 | Zende et al. | |
| 9,531,168 B2 | 12/2016 | Bugaris et al. | |
| 9,577,412 B2 | 2/2017 | Prakash et al. | |
| 9,653,896 B2 | 5/2017 | Lafond et al. | |
| 9,668,385 B2 | 5/2017 | Manahan et al. | |
| 9,871,358 B2 | 1/2018 | Pawar et al. | |
| 9,966,740 B2 | 5/2018 | Faber et al. | |
| 10,014,668 B2 | 7/2018 | Rajauria et al. | |
| 10,141,725 B2 * | 11/2018 | Ionescu | H02B 13/025 |
| 10,305,262 B2 * | 5/2019 | Johnson | H02B 1/306 |
| 10,431,963 B2 * | 10/2019 | Rajauria | H02B 1/30 |
| 2007/0097604 A1 | 5/2007 | Bruski et al. | |
| 2015/0162727 A1 * | 6/2015 | Macias | H02B 13/02 |
| | | | 361/608 |
| 2018/0323022 A1 * | 11/2018 | Skibinski | H05K 7/20145 |

\* cited by examiner

Right Side View

Provide a box shaped bucket of a modular bucket assembly in an arc resistant switchgear, the box shaped bucket having an interior bucket side wall, an exterior bucket side wall with vents in a first periphery, a bucket rear wall, a bucket top wall and a bucket bottom wall, wherein all of the bucket walls defining the auxiliary compartment of a switchgear cabinet, and wherein the vents in the exterior bucket side wall define an arc gas venting passage in communication with an interior of the auxiliary compartment for exhausting arc gasses from the auxiliary compartment to an exterior of the switchgear cabinet

910

Provide a metal enclosure mounted on the bucket bottom wall for enhancing the auxiliary compartment, wherein the metal enclosure having side opening with a second periphery such that the second periphery overlaps the first periphery of the exterior bucket side wall, wherein the metal enclosure to house one or more direct power connected devices and one or more protective fuses, and wherein the metal enclosure is configured to withstand arc fault pressures generated in the arc resistant switchgear

ENHANCING AN AUXILIARY COMPARTMENT OF A MODULAR BUCKET ASSEMBLY IN AN ARC RESISTANT SWITCHGEAR

BACKGROUND

1. Field

Aspects of the present invention generally relate to enhancing an auxiliary compartment of a modular bucket assembly in an arc resistant switchgear.

2. Description of the Related Art

Switchgear and switchboard are general terms which cover metal enclosures housing switching and interrupting devices such as fuses and circuit breakers along with associated control, instrumentation and metering devices. Switchgear and switchboard also house assemblies of these devices with associated buses, interconnections and supporting structures used for distribution of electric power.

There are High Voltage switchgear and switchboards, Medium Voltage switchgear and switchboards, and Low Voltage switchgear and switchboards. This invention is primarily geared towards the Low voltage switchgear and switchboards. Low voltage switchgear and switchboards operate at voltages up to 635 volts and with continuous currents that can exceed 5000 amperes. They are designed to withstand short-circuit currents up to 200,000 amperes.

Typical switchgear is designed to withstand the effects of bolted (non-arcing) faults on the load terminals and this capability is validated during Short-Circuit Current and Short-Time Current Withstand Tests in IEEE Standard C37.20.1, the disclosure of which is incorporated herein by reference.

Customers have the need for Arc Resistant Switchgear that are front accessible (no rear access required for installation and/or operation and/or maintenance) and have high large breaker (Power Circuit Breaker) density. Applications often do not have area available for rear aisles and desire to have all accessibility from the front. Many features needed to be compressed into reduced spaces requiring innovative solutions.

The occurrence of an arcing fault inside the switchgear produces physical phenomena that are different from bolted faults. For example, the energy resulting from an internal arc in air causes a sudden pressure and temperature increase inside the enclosure. Materials involved in or exposed to the arc produce hot decomposition products, both gaseous and particulate, which may be discharged to the outside of the enclosure.

An internal arcing fault can be caused by insulation degradation, insulation, contamination, entrance of vermin, foreign objects coming into contact with the energized bus, or any other unplanned condition that creates an electrical discharge path through air. During an arcing fault, the voltage at the fault location is essentially the system voltage and the fault energy is focused within the switchgear enclosure. Arc temperatures can exceed 20,000 degrees Kelvin, rapidly heating the air and vaporizing metal parts. The expanding plasma creates severe mechanical and thermal stress in the equipment which can blow open doors and covers and burn through or fragment the enclosure and/or cause severe injury to an operator who may happen to be nearby.

An arc resistant switchgear qualified to IEEE C37.20.7 is intended to provide an additional degree of protection to the personal performing normal operating duties in proximity to the energized equipment. Accessibility Type 1 arc resistant switchgear has features at the front of the equipment. Accessibility Type 2 arc resistant switchgear has features at the front, sides and rear of the equipment. Accessibility Type 2B provides Type 2 protection with control or instrumentation compartment doors open.

New guidelines in IEEE C37.20.7 state that an auxiliary compartment can also house direct power connected devices. To attain Type 2B accessibility rating, personnel can perform normal operating duties in the auxiliary compartment with the auxiliary door open and be safe in the event of an arcing fault at the direct power connected devices. An arc resistant switchgear design requires a means to direct the hot decomposition products created by an internal arcing fault away from the front, sides and rear of the equipment and away from personnel.

Therefore, there is a need for a simplified design which enables a switchgear to safely discharge arc gases.

SUMMARY

Briefly described, aspects of the present invention relate to an arc resistant switchgear qualified to IEEE C37.20.7, the disclosure of which is incorporated herein by reference, so it is intended to provide an additional degree of protection to the personal performing normal operating duties in proximity to the energized equipment. Accessibility Type 1 arc resistant switchgear has features at the front of the equipment. Accessibility Type 2 Arc Resistant switchgear has features at the front, sides and rear of the equipment. Accessibility Type 2B provides Type 2 protection with control or instrumentation compartment doors open. This platform, 'Front Connected Switchgear' has the shallowest section depth in the industry. There is a need in arc resistant switchgear design to provide a means to direct the hot decomposition products created by an internal arcing fault away from the front, sides and rear of the equipment and away from personnel. There is a need to keep the section depth of the Front Connected Switchgear same in Arc Resistant construction. It provides an additional degree of protection to any personnel who are performing normal operating duties in proximity to the energized equipment with the auxiliary compartment doors open in the event of an internal arc fault. If the direct power connected devices/fuses were in a standard auxiliary compartment, the arc blast would exit the front of the switchgear and possibly harming the operator. The front connected switchgear section depth is minimized. Shallowest section depth in the industry for this switchgear.

In accordance with one illustrative embodiment of the present invention, a modular bucket assembly of a low voltage switchgear is provided. The modular bucket assembly comprises a box shaped bucket having an interior bucket side wall, an exterior bucket side wall with vents in a first periphery, a bucket rear wall, a bucket top wall and a bucket bottom wall. All of the bucket walls define an auxiliary compartment of a switchgear cabinet. The vents in the exterior bucket side wall define an arc gas venting passage in communication with an interior of the auxiliary compartment for exhausting arc gasses from the auxiliary compartment to an exterior of the switchgear cabinet. The modular bucket assembly further comprises a metal enclosure mounted on the bucket bottom wall. The metal enclosure has a side opening with a second periphery such that the second periphery overlaps the first periphery of the exterior bucket side wall. The metal enclosure to house one or more direct power connected devices and one or more protective fuses. The metal enclosure is configured to withstand arc fault pressures generated in the low voltage switchgear.

In accordance with one illustrative embodiment of the present invention, a low voltage switchgear is provided. It comprises an electrical distribution system switchgear cabinet defining a compartment front opening including a compartment front opening periphery. The electrical distribution system switchgear cabinet has a swinging switchgear door for selectively covering the entire compartment front opening when closed against the compartment front opening periphery thereof and providing access to the compartment front opening when opened. The electrical distribution system switchgear cabinet further includes first and second side walls, back wall, floor and top cover forming a closed structure about the compartment front opening. The electrical distribution system switchgear cabinet further includes a compartment formed within the electrical distribution system switchgear cabinet front opening, for coupled receipt of a modular bucket assembly. The modular bucket assembly includes a box shaped bucket having an interior bucket side wall, an exterior bucket side wall with vents in a first periphery, a bucket rear wall, a bucket top wall and a bucket bottom wall. All of the bucket walls define an auxiliary compartment of the electrical distribution system switchgear cabinet. The vents in the exterior bucket side wall define an arc gas venting passage in communication with an interior of the auxiliary compartment for exhausting arc gasses from the auxiliary compartment to an exterior of the electrical distribution system switchgear cabinet. The modular bucket assembly includes a metal enclosure mounted on the bucket bottom wall. The metal enclosure has a side opening with a second periphery such that the second periphery overlaps the first periphery of the exterior bucket side wall. The metal enclosure to house one or more direct power connected devices and one or more protective fuses. The metal enclosure is configured to withstand arc fault pressures generated in the low voltage switchgear.

In accordance with one illustrative embodiment of the present invention, a method of enhancing an auxiliary compartment of a modular bucket assembly in an arc resistant switchgear is provided. The method comprises providing a box shaped bucket having an interior bucket side wall, an exterior bucket side wall with vents in a first periphery, a bucket rear wall, a bucket top wall and a bucket bottom wall. All of the bucket walls define the auxiliary compartment of a switchgear cabinet. The vents in the exterior bucket side wall define an arc gas venting passage in communication with an interior of the auxiliary compartment for exhausting arc gasses from the auxiliary compartment to an exterior of the switchgear cabinet. The method further comprises providing a metal enclosure mounted on the bucket bottom wall. The metal enclosure has a side opening with a second periphery such that the second periphery overlaps the first periphery of the exterior bucket side wall. The metal enclosure to house one or more direct power connected devices and one or more protective fuses. The metal enclosure is configured to withstand arc fault pressures generated in the arc resistant switchgear.

BRIEF DESCRIPTION OF THE DRAWINGS

FIG. 9 illustrates a schematic view of a flow chart of a method of enhancing an auxiliary compartment of a modular bucket assembly in an arc resistant switchgear in accordance with an exemplary embodiment of the present invention.

DETAILED DESCRIPTION

Figure 1:
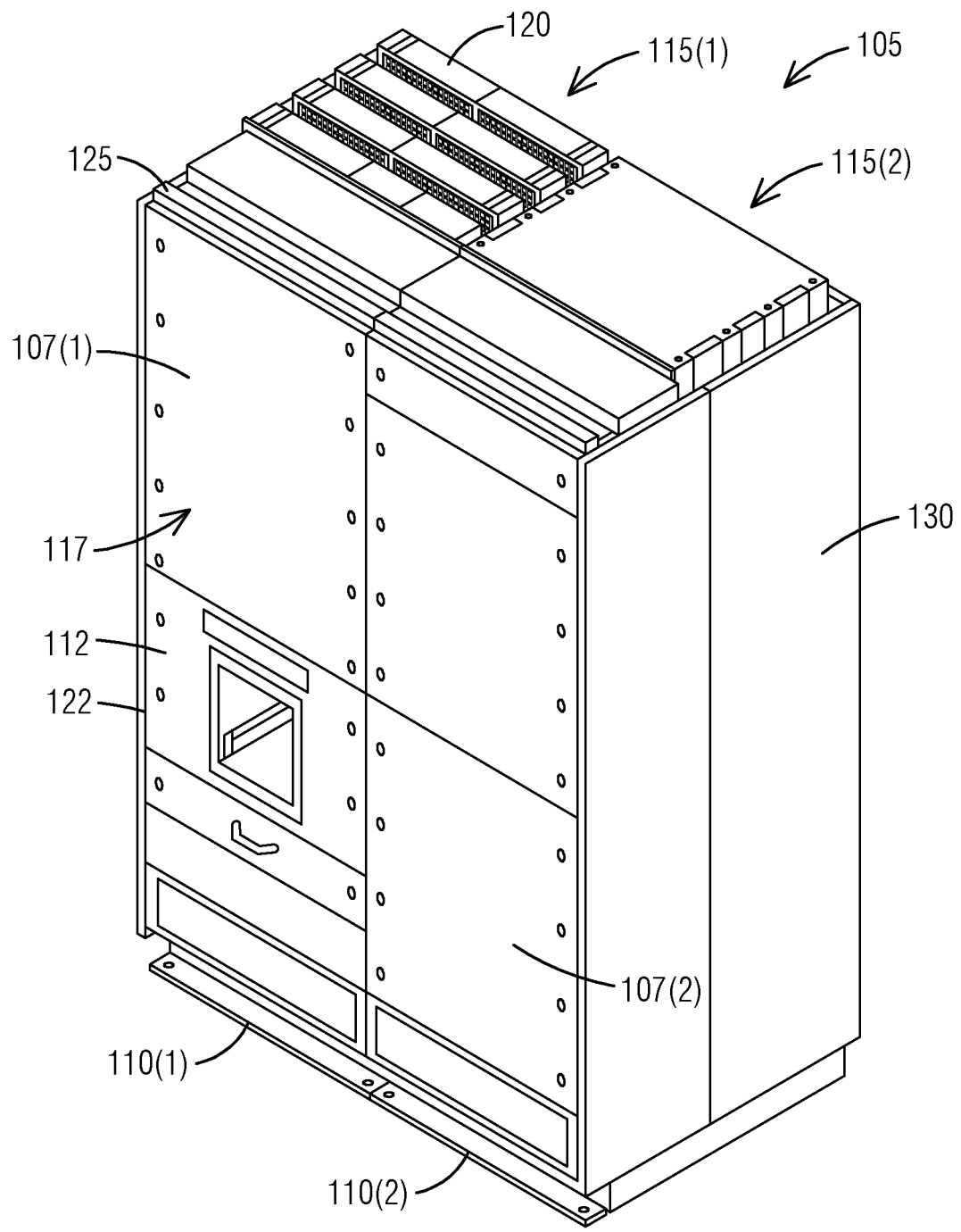
FIG. 1 illustrates a perspective view of a front connected switchgear assembly consisting of multiple switchgear sections including a circuit breaker section and a cable section assembled on respective riser bases in accordance with an exemplary embodiment of the present invention.

To facilitate an understanding of embodiments, principles, and features of the present invention, they are explained hereinafter with reference to implementation in illustrative embodiments. In particular, they are described in the context of enhancing an auxiliary compartment of a modular bucket assembly in an arc resistant switchgear. An auxiliary compartment houses direct power connected devices. To attain Type 2B accessibility rating, personnel can perform normal operating duties in the auxiliary compartment with the auxiliary door open and be safe in the event of an arcing fault at the direct power connected devices. An arc resistant switchgear design provides a means to direct the hot decomposition products created by an internal arcing fault away from the front, sides and rear of the equipment and away from personnel. A simplified design is provided which enables a switchgear to safely discharge arc gases. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the switchgear having an enhanced auxiliary compartment of a modular bucket assembly according to the present disclosure are described below with reference to FIGS. 1-9 herein. Like reference numerals used in the drawings identify similar or identical elements throughout the several views. The drawings are not necessarily drawn to scale.

Consistent with one embodiment of the present invention, FIG. 1 represents a perspective view of a front connected switchgear assembly 105 consisting of multiple switchgear sections including a circuit breaker section 107(1), and a cable section 107(2) assembled on respective riser bases 110(1-2) in accordance with an exemplary embodiment of the present invention. Each circuit breaker section 107(1) can contain up to four circuit breaker compartments 112 containing one circuit breaker per compartment. Each section has a ventilation structure 115(1-2) located on top. Each circuit breaker section 107(1) can also contain up to four instrumentation or control compartments 117. The circuit breaker section 107(1) has a vent stack 120 with flaps. The cable section 107(2) is a load cable connection section.

When an arc fault event occurs in the front connected switchgear assembly 105 at the one or more protective fuses in the cable section compartment gases/plasma then flows through a vented panel of a exterior bucket side wall and towards a side and a rear of a low voltage switchgear (see FIG. 3) and towards a top where the gases/plasma are safely discharged to an outside air through the ventilation structure 115(1-2). The ventilation structure 115(1-2) has at least one set of ventilation holes to channel the passage of the arc. The front connected switchgear assembly 105 has at least one main breaker section 122. An equipment compartment accommodates at least one equipment selected from a group consisting of a circuit breaker, an electronic device, and an electronic module. The ventilation structure 115(1-2) has at least one vent stack 120 for the passage of an arc plasma. The vent stack 120 is located on an upper surface 125 of the front connected switchgear assembly 105. The vent stack 120 is secured to the front connected switchgear assembly 105 via at least one securing means (not seen).

The front connected switchgear assembly 105 comprises an electrical distribution system switchgear cabinet 130 defining a compartment front opening including a compartment front opening periphery. The electrical distribution system switchgear cabinet 130 having a swinging switchgear door for selectively covering the entire compartment front opening when closed against a compartment front opening periphery thereof and providing access to the compartment front opening when opened. The front connected switchgear assembly 105 further comprises first and second side walls, back wall, floor and top cover forming a closed structure about the compartment front opening. The front connected switchgear assembly 105 further comprises a compartment formed within the electrical distribution system switchgear cabinet 130 front opening, for coupled receipt of a modular bucket assembly.

Figure 2:
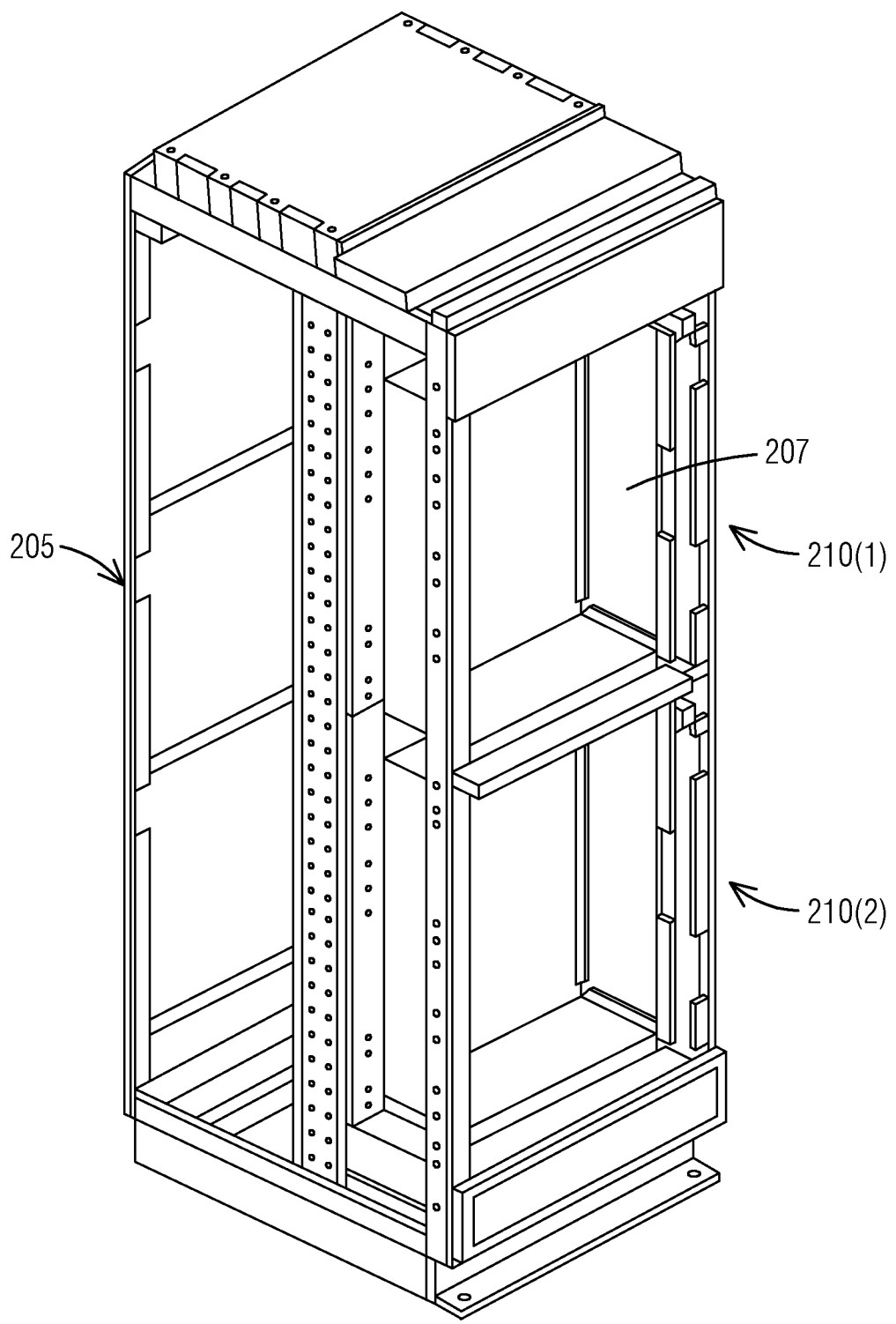
FIG. 2 illustrates an isometric view of an arc resistant front connected section with an auxiliary compartment having an auxiliary door removed in accordance with an exemplary embodiment of the present invention.

Referring to FIG. 2, it illustrates an isometric view of an arc resistant front connected section 205 with an auxiliary compartment 207 having an auxiliary door removed in accordance with an exemplary embodiment of the present invention. For example, auxiliary/instrumentation compartments may be in top and lower positions 210(1-2) of the arc resistant front connected section 205. The auxiliary/instrumentation compartment doors are removed for clarity.

Figure 3:
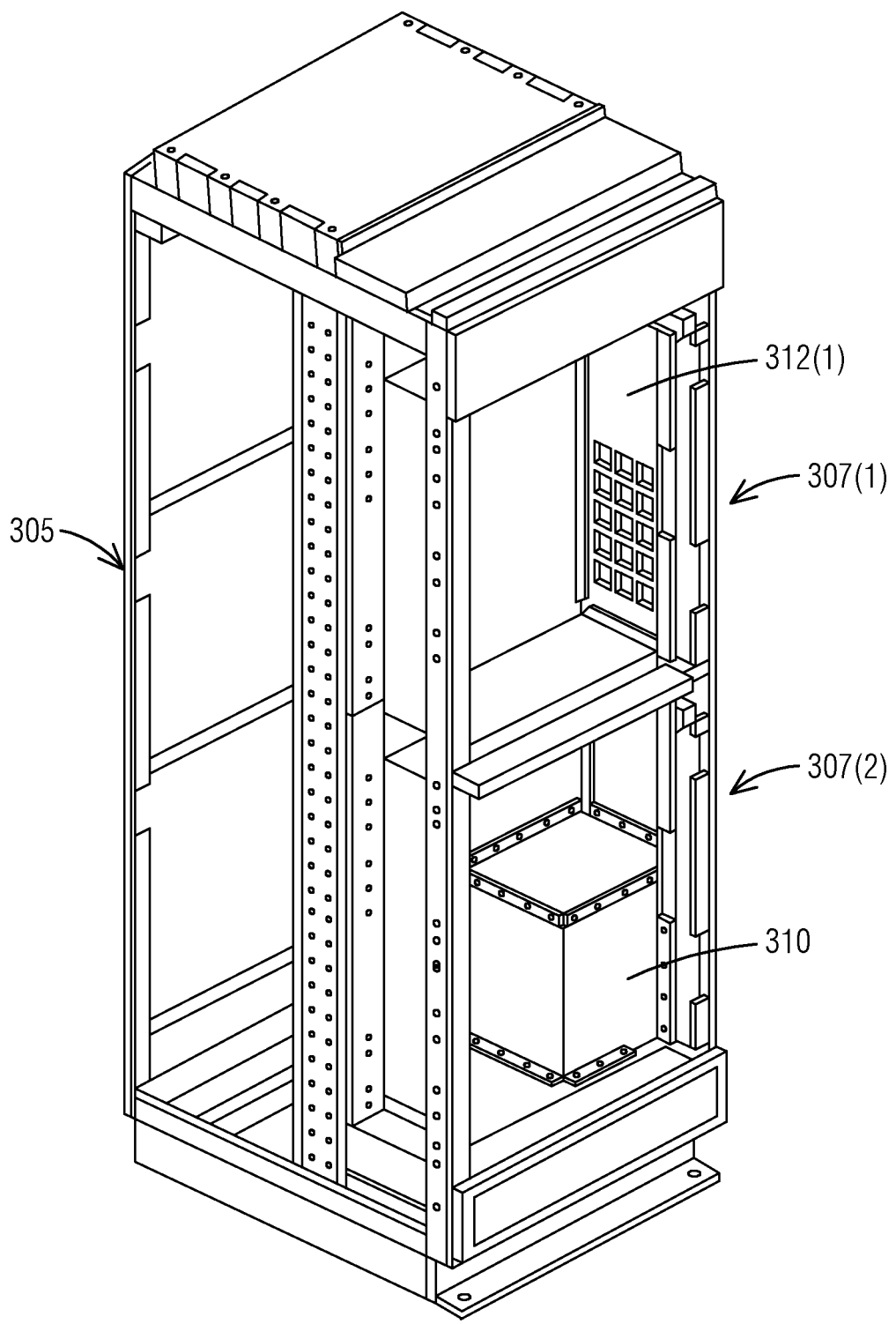
FIG. 3 illustrates an isometric view of an arc resistant front connected section including an enhanced auxiliary compartment having its door removed for clarity and a metal enclosure which houses one or more direct power connected devices and one or more protective fuses in accordance with an exemplary embodiment of the present invention.

Turning now to FIG. 3, it illustrates an isometric view of an arc resistant front connected section 305 including a first enhanced auxiliary compartment 307(1) and a second enhanced auxiliary compartment 307(2) having their doors removed for clarity and a metal enclosure 310 which houses one or more direct power connected devices (not seen) and one or more protective fuses (not seen) in accordance with an exemplary embodiment of the present invention.

FIG. 3 shows enhanced Auxiliary/instrumentation compartments 307(1-2) in top and lower positions of the section 305. The auxiliary/instrumentation compartment doors are removed for clarity. In the top position, the first enhanced auxiliary compartment 307(1) is shown to include a vented side panel 312(1). The openings on the vented side panel 312(1) help in the flow of the arc gases/plasma towards a side and a rear of a switchgear in the event of an arcing fault in the first enhanced auxiliary compartment 307(1). The metal enclosure 310 is not shown in the top position of the first enhanced auxiliary compartment 307(1) for clarity. The bottom position of the second enhanced auxiliary compartment 307(2) shows the metal enclosure 310 which houses direct power connected devices. This is a 'bomb proof' box within an auxiliary compartment and can withstand the arc fault pressures generated in low voltage switchgears.

Figure 4:
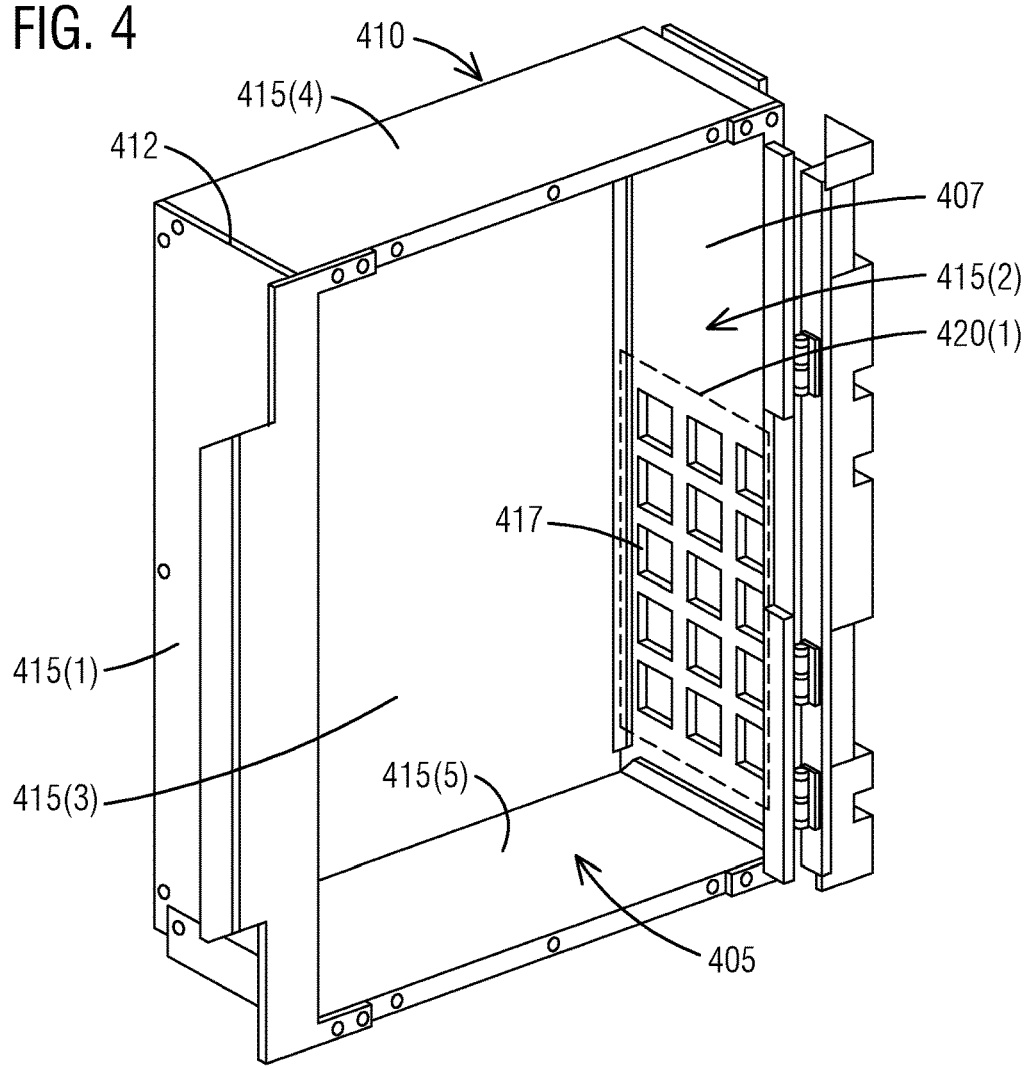
FIG. 4 illustrates an isometric view of an arc resistant enhanced auxiliary compartment with a vented side panel on which a metal enclosure is not yet mounted in accordance with an exemplary embodiment of the present invention.

FIG. 4 illustrates an isometric view of an arc resistant enhanced auxiliary compartment 405 with a vented side panel 407 on which a metal enclosure is not yet mounted in accordance with an exemplary embodiment of the present invention. The arc resistant enhanced auxiliary compartment 405 is defined by a modular bucket assembly 410. The modular bucket assembly 410 includes a box shaped bucket 412 having an interior bucket side wall 415(1), an exterior bucket side wall 415(2) with vents 417 in a first periphery 420(1), a bucket rear wall 415(3), a bucket top wall 415(4) and a bucket bottom wall 415(5). All of the bucket walls 415(1-5) define the auxiliary compartment 405 of a switchgear cabinet. The vents 417 in the exterior bucket side wall 415(2) define an arc gas venting passage in communication with an interior of the auxiliary compartment 405 for exhausting arc gasses from the auxiliary compartment 405 to an exterior of the switchgear cabinet. The box shaped bucket 412 is sized such that a gap is formed between an open front bucket periphery and a compartment front opening periphery of a compartment of the switchgear cabinet when the modular bucket assembly 410 is inserted therein. The modular bucket assembly 410 is adapted for retention of a circuit breaker therein and insertion into a switchgear compartment.

Figure 5:
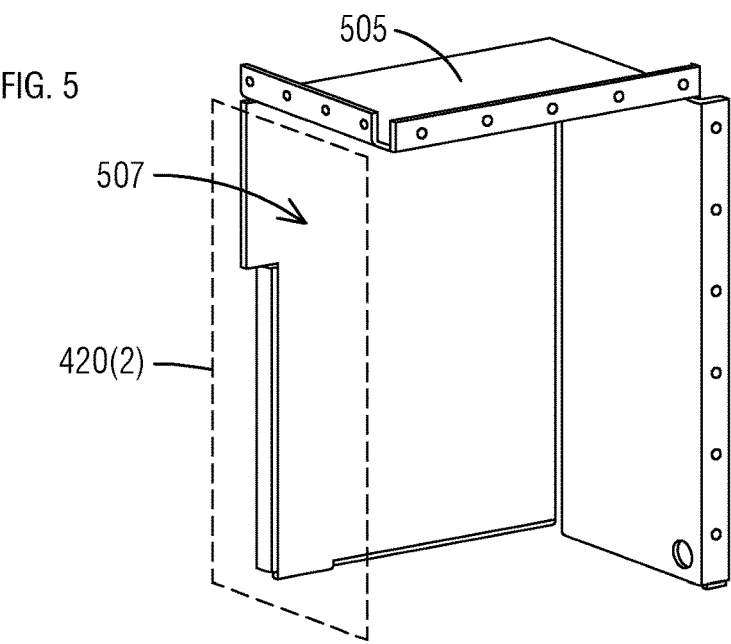
FIG. 5 illustrates an isometric view of a metal enclosure to be mounted on the vented side panel of FIG. 4 in accordance with an exemplary embodiment of the present invention.

As seen in FIG. 5, it illustrates an isometric view of a metal enclosure 505 to be mounted on the vented side panel 407 of FIG. 4 in accordance with an exemplary embodiment of the present invention. The metal enclosure 505 has a side opening 507 with a second periphery 420(2) such that the second periphery 420(2) overlaps the first periphery 420(1) of the exterior bucket side wall 415(2). The metal enclosure 505 is a 'bomb proof' box within the auxiliary compartment 405 of the switchgear cabinet that can withstand the arc fault pressures generated in a low voltage switchgear. One or more protective fuses are mounted inside the metal enclosure 505 which is a steel enclosure within the auxiliary compartment 405 of the switchgear cabinet.

Figure 6:
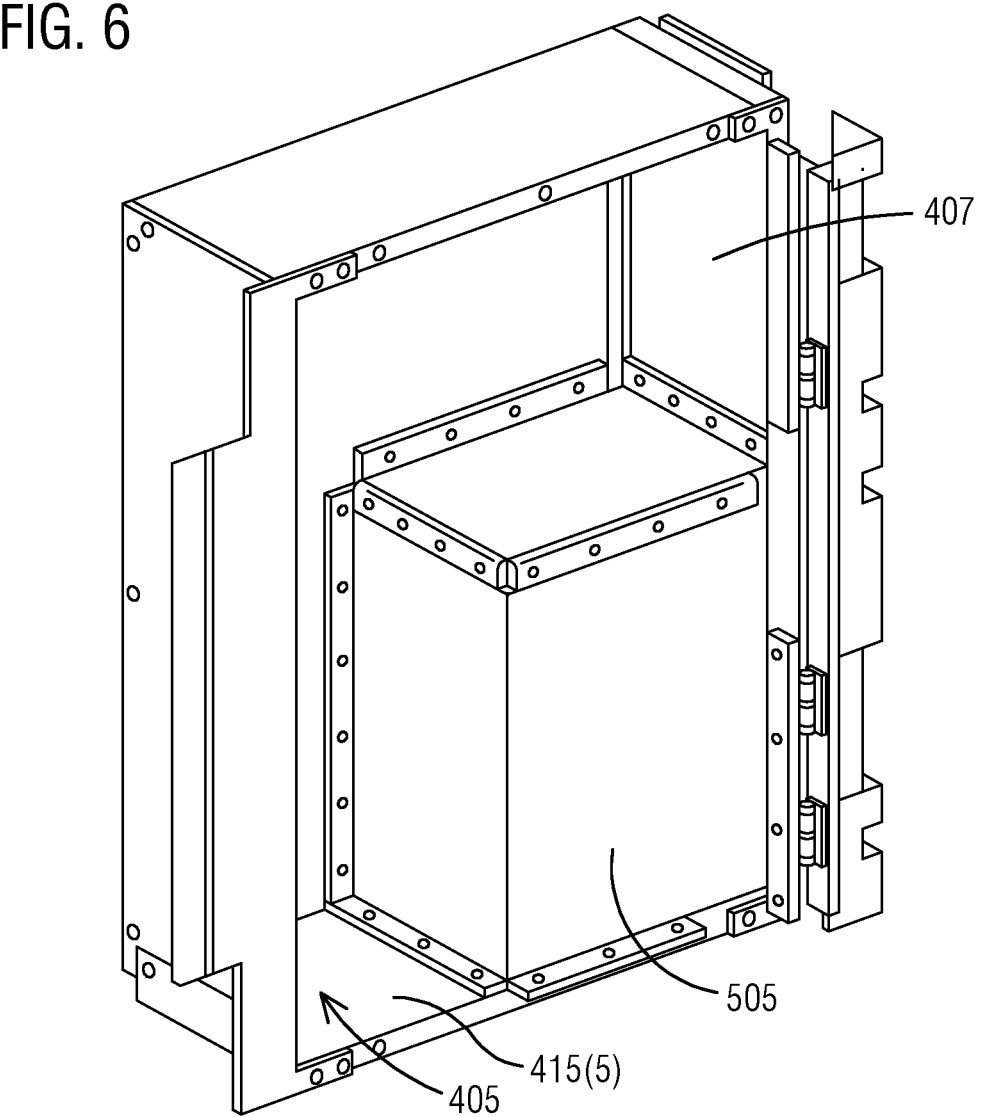
FIG. 6 illustrates an isometric view of the arc resistant enhanced auxiliary compartment of FIG. 4 in which a metal enclosure is mounted on the vented side panel of FIG. 4 in accordance with an exemplary embodiment of the present invention.

As seen in FIG. 6, it illustrates an isometric view of the arc resistant enhanced auxiliary compartment 405 of FIG. 4 in which the metal enclosure 505 is mounted on the vented side panel 407 of FIG. 4 in accordance with an exemplary embodiment of the present invention. The metal enclosure 505 is mounted on the bucket bottom wall 415(5). The metal enclosure 505 to house one or more direct power connected devices and one or more protective fuses. The metal enclosure 505 is configured to withstand arc fault pressures generated in a low voltage switchgear.

The low voltage switchgear may include a front, two sides and a rear such that the vents 417 of the exterior bucket side wall 415(2) to direct hot decomposition products created by an internal arcing fault away from the front, two sides and the rear of the low voltage switchgear. The exterior bucket side wall 415(2) with the vented side panel 407 having openings that are configured to assist in the flow of arc gases/plasma towards a side and a rear of the low voltage switchgear in an event of an arcing fault in the auxiliary compartment 405 of the switchgear cabinet. When an arc fault event occurs in the metal enclosure 505 of the auxiliary compartment 405 at the one or more protective fuses gases/plasma then flows through the vented side panel 407 of the exterior bucket side wall 415(2) and towards a side and a rear of the low voltage switchgear and towards a top where the gases/plasma are safely discharged to an outside air through a ventilation structure.

Figure 7:
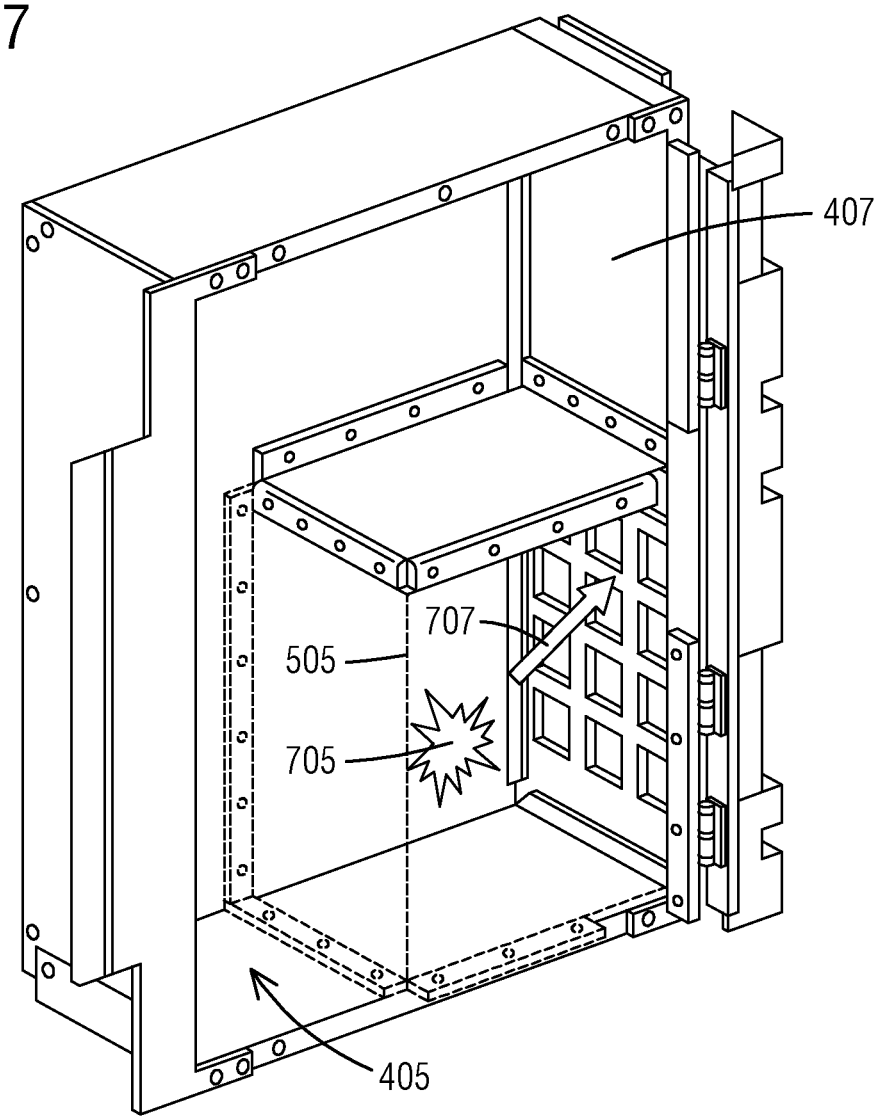
FIG. 7 illustrates an isometric view of the enhanced auxiliary compartment of FIG. 4 in which there is an event of an arc fault inside the metal enclosure in accordance with an exemplary embodiment of the present invention.

In FIG. 7, it illustrates an isometric view of the enhanced auxiliary compartment 405 of FIG. 4 in which there is an event of an arc fault 705 inside the metal enclosure in accordance with an exemplary embodiment of the present invention. FIG. 7 shows the auxiliary compartment 405 of a front connected section. In the event of the arc fault 705 on the protective fuses inside the 'bomb proof' steel enclosure 505, the gasses/plasma 707 flows towards the side of the switchgear and towards the back and top where it is safely discharged through the ventilation structure. If the protective fuses were in a standards auxiliary compartment, the arc blast would exit the front of the switchgear failing the testing and harming the operating personnel.

Figure 8:
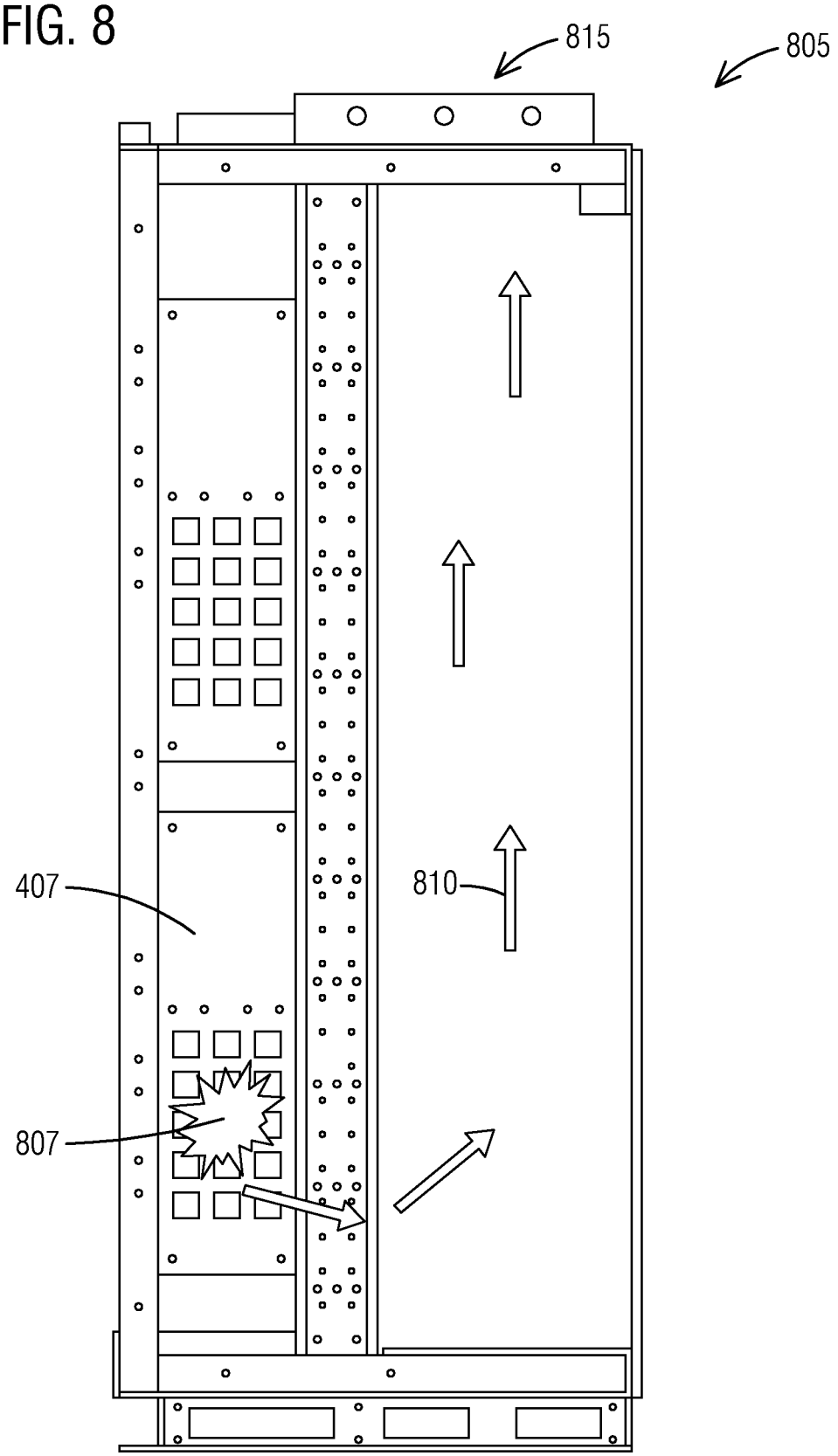
FIG. 8 illustrates a right-side view of an arc resistant front connected switchgear with an arc fault event occurring in the metal enclosure of the enhanced auxiliary compartment at primary fuses in accordance with an exemplary embodiment of the present invention.

With regard to FIG. 8, it illustrates a right-side view of an arc resistant front connected switchgear 805 with an arc fault event 807 occurring in the metal enclosure 505 of the enhanced auxiliary compartment 405 at primary fuses in accordance with an exemplary embodiment of the present invention. The gases/plasma 810 flows through the vented side panel 407 and towards the side and rear of the switchgear 805 and towards the top where they are safely discharged to the outside air through a ventilation structure 815.

With respect to FIG. 9, it illustrates a schematic view of a flow chart of a method 900 of enhancing an auxiliary compartment of a modular bucket assembly in an arc resistant switchgear in accordance with an exemplary embodiment of the present invention. Reference is made to the elements and features described in FIGS. 1-8. It should be appreciated that some steps are not required to be performed in any particular order, and that some steps are optional.

The method 900 comprises a step 905 of providing a box shaped bucket having an interior bucket side wall, an exterior bucket side wall with vents in a first periphery, a bucket rear wall, a bucket top wall and a bucket bottom wall. All of the bucket walls define the auxiliary compartment of a switchgear cabinet. The vents in the exterior bucket side wall define an arc gas venting passage in communication with an interior of the auxiliary compartment for exhausting arc gasses from the auxiliary compartment to an exterior of the switchgear cabinet.

The method 900 further comprises a step 910 of providing a metal enclosure mounted on the bucket bottom wall. The metal enclosure has a side opening with a second periphery such that the second periphery overlaps the first periphery of the exterior bucket side wall. The metal enclosure is configured to house one or more direct power connected devices and one or more protective fuses. The metal enclosure is further configured to withstand arc fault pressures generated in the arc resistant switchgear. The arc resistant switchgear includes a front, two sides and a rear such that the vents of the exterior bucket side wall to direct hot decomposition products created by an internal arcing fault away from the front, two sides and the rear of the arc resistant switchgear.

While a front connected switchgear is described here a range of one or more other switchgears or other forms of switchgears are also contemplated by the present invention. For example, other types of switchgears may be implemented based on one or more features presented above without deviating from the spirit of the present invention.

The techniques described herein can be particularly useful for low voltage switchgears and switchboards. While particular embodiments are described in terms of a low voltage switchgear, the techniques described herein are not limited to such a structure but can also be used with other switchgears and switchboards.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A modular bucket assembly of a low voltage switchgear, comprising:
    a box shaped bucket having an interior bucket side wall, an exterior bucket side wall with vents in a first periphery, a bucket rear wall, a bucket top wall and a bucket bottom wall, wherein all of the bucket walls defining an auxiliary compartment of a switchgear cabinet, and
    wherein the vents in the exterior bucket side wall define an arc gas venting passage in communication with an interior of the auxiliary compartment for exhausting arc gasses from the auxiliary compartment to an exterior of the switchgear cabinet; and
    a metal enclosure mounted on the bucket bottom wall,
    wherein the metal enclosure having a side opening with a second periphery such that the second periphery overlaps the first periphery of the exterior bucket side wall,
    wherein the metal enclosure to house one or more direct power connected devices and one or more protective fuses, and
    wherein the metal enclosure is configured to withstand arc fault pressures generated in the low voltage switchgear.

2. The modular bucket assembly of claim 1, wherein the low voltage switchgear including a front, two sides and a rear such that the vents of the exterior bucket side wall to direct hot decomposition products created by an internal arcing fault away from the front, two sides and the rear of the low voltage switchgear.

3. The modular bucket assembly of claim 1, wherein the exterior bucket side wall is a vented side panel with openings that are configured to assist in the flow of arc gases/plasma towards a side and a rear of the low voltage switchgear in an event of an arcing fault in the auxiliary compartment of the switchgear cabinet.

4. The modular bucket assembly of claim 1, wherein the metal enclosure is a 'bomb proof' box within the auxiliary compartment of the switchgear cabinet that can withstand the arc fault pressures generated in the low voltage switchgear.

5. The modular bucket assembly of claim 1, wherein the box shaped bucket sized such that a gap is formed between the open front bucket periphery and a compartment front opening periphery of a compartment of the switchgear cabinet when the bucket assembly is inserted therein.

6. The modular bucket assembly of claim 1, wherein the one or more protective fuses are mounted inside the metal enclosure which is a steel enclosure within the auxiliary compartment of the switchgear cabinet.

7. The modular bucket assembly of claim 6, wherein when an arc fault event occurs in the steel enclosure of the auxiliary compartment at the one or more protective fuses gases/plasma then flows through a vented panel of the exterior bucket side wall and towards a side and a rear of the low voltage switchgear and towards a top where the gases/plasma are safely discharged to an outside air through a ventilation structure.

8. The modular bucket assembly of claim 1, adapted for retention of a circuit breaker therein and insertion into a switchgear compartment.

9. The modular bucket assembly of claim 1, further comprising:
    an electrical distribution system switchgear cabinet defining a compartment front opening including a compartment front opening periphery, the electrical distribution system switchgear cabinet having:

a swinging switchgear door for selectively covering the entire compartment front opening when closed against the compartment front opening periphery thereof and providing access to the compartment front opening when opened.

10. The modular bucket assembly of claim 9, further comprising:
first and second side walls, back wall, floor and top cover forming a closed structure about the compartment front opening;
a compartment formed within the electrical distribution system switchgear cabinet front opening, for coupled receipt of the modular bucket assembly.

11. A low voltage switchgear, comprising:
an electrical distribution system switchgear cabinet defining a compartment front opening including a compartment front opening periphery, the electrical distribution system switchgear cabinet having: a swinging switchgear door for selectively covering the entire compartment front opening when closed against the compartment front opening periphery thereof and providing access to the compartment front opening when opened;
first and second side walls, back wall, floor and top cover forming a closed structure about the compartment front opening; and
a compartment formed within the electrical distribution system switchgear cabinet front opening, for coupled receipt of a modular bucket assembly including:
a box shaped bucket having an interior bucket side wall, an exterior bucket side wall with vents in a first periphery, a bucket rear wall, a bucket top wall and a bucket bottom wall, wherein all of the bucket walls defining an auxiliary compartment of the electrical distribution system switchgear cabinet, and
wherein the vents in the exterior bucket side wall define an arc gas venting passage in communication with an interior of the auxiliary compartment for exhausting arc gasses from the auxiliary compartment to an exterior of the electrical distribution system switchgear cabinet, and
a metal enclosure mounted on the bucket bottom wall, wherein the metal enclosure having a side opening with a second periphery such that the second periphery overlaps the first periphery of the exterior bucket side wall,
wherein the metal enclosure to house one or more direct power connected devices and one or more protective fuses, and
wherein the metal enclosure is configured to withstand arc fault pressures generated in the low voltage switchgear.

12. The low voltage switchgear of claim 11, wherein the low voltage switchgear including a front, two sides and a rear such that the vents of the exterior bucket side wall to direct hot decomposition products created by an internal arcing fault away from the front, two sides and the rear of the low voltage switchgear.

13. The low voltage switchgear of claim 11, wherein the exterior bucket side wall is a vented side panel with openings that are configured to assist in the flow of arc gases/plasma towards a side and a rear of the low voltage switchgear in an event of an arcing fault in the auxiliary compartment of the switchgear cabinet.

14. The low voltage switchgear of claim 11, wherein the metal enclosure is a 'bomb proof' box within the auxiliary compartment of the switchgear cabinet that can withstand the arc fault pressures generated in the low voltage switchgear.

15. The low voltage switchgear of claim 11, wherein the box shaped bucket sized such that a gap is formed between the open front bucket periphery and a compartment front opening periphery of a compartment of the switchgear cabinet when the bucket assembly is inserted therein.

16. The low voltage switchgear of claim 11, wherein the one or more protective fuses are mounted inside the metal enclosure which is a steel enclosure within the auxiliary compartment of the switchgear cabinet.

17. The low voltage switchgear of claim 16, wherein when an arc fault event occurs in the steel enclosure of the auxiliary compartment at the one or more protective fuses gases/plasma then flows through a vented panel of the exterior bucket side wall and towards a side and a rear of the low voltage switchgear and towards a top where the gases/plasma are safely discharged to an outside air through a ventilation structure.

18. The low voltage switchgear of claim 11, adapted for retention of a circuit breaker therein and insertion into a switchgear compartment.

19. A method of enhancing an auxiliary compartment of a modular bucket assembly in an arc resistant switchgear, the method comprising:
providing a box shaped bucket having an interior bucket side wall, an exterior bucket side wall with vents in a first periphery, a bucket rear wall, a bucket top wall and a bucket bottom wall, wherein all of the bucket walls defining the auxiliary compartment of a switchgear cabinet, and
wherein the vents in the exterior bucket side wall define an arc gas venting passage in communication with an interior of the auxiliary compartment for exhausting arc gasses from the auxiliary compartment to an exterior of the switchgear cabinet; and
providing a metal enclosure mounted on the bucket bottom wall,
wherein the metal enclosure having a side opening with a second periphery such that the second periphery overlaps the first periphery of the exterior bucket side wall,
wherein the metal enclosure to house one or more direct power connected devices and one or more protective fuses, and
wherein the metal enclosure is configured to withstand arc fault pressures generated in the arc resistant switchgear.

20. The method of claim 19, wherein the arc resistant switchgear including a front, two sides and a rear such that the vents of the exterior bucket side wall to direct hot decomposition products created by an internal arcing fault away from the front, two sides and the rear of the arc resistant switchgear.

* * * * *